United States Patent [19]
Meyer

[11] Patent Number: 5,077,516
[45] Date of Patent: Dec. 31, 1991

[54] GENERATOR UNIT

[75] Inventor: Friedhelm Meyer, Illingen, Fed. Rep. of Germany

[73] Assignee: Robert Bosch GmbH, Stuttgart, Fed. Rep. of Germany

[21] Appl. No.: 490,661
[22] PCT Filed: Jul. 1, 1988
[86] PCT No.: PCT/DE88/00408
§ 371 Date: Mar. 5, 1990
§ 102(e) Date: Mar. 5, 1990
[87] PCT Pub. No.: WO89/02667
PCT Pub. Date: Mar. 23, 1989

[30] Foreign Application Priority Data
Sep. 5, 1987 [DE] Fed. Rep. of Germany ....... 3729772

[51] Int. Cl.$^5$ .............................................. H02J 7/14
[52] U.S. Cl. .......................................... 322/7; 322/15; 322/23; 322/28
[58] Field of Search ...................... 322/7, 8, 22, 23, 28, 322/15

[56] References Cited
U.S. PATENT DOCUMENTS

| | | | |
|---|---|---|---|
| 4,044,293 | 8/1977 | Follmer | 320/15 |
| 4,207,511 | 6/1980 | Radtke | 320/15 X |
| 4,322,630 | 3/1982 | Mezera et al. | 290/40 C |
| 4,542,462 | 9/1985 | Morishita et al. | 320/32 X |
| 4,670,704 | 6/1987 | Maehara et al. | 322/8 |
| 5,021,727 | 6/1991 | Mashino | 322/7 |

FOREIGN PATENT DOCUMENTS

| | | |
|---|---|---|
| 0094685 | 11/1983 | European Pat. Off. . |
| 2427724 | 12/1979 | France . |
| 2518839 | 6/1983 | France . |
| 2525038 | 10/1983 | France . |
| 2176666A | 12/1986 | United Kingdom . |

Primary Examiner—R. J. Hickey
Attorney, Agent, or Firm—Michael J. Striker

[57] ABSTRACT

A generator unit for a motor vehicle includes a battery, a generator, an intermediate drive for transmitting a drive torque from the internal combustion engine to said generator, an on-board power supply system, and an evaluating circuit. At least one of input value of engine speed, generator voltage, generator speed, battery voltage, battery current, battery temperature, and consumer means voltage, and at least one of an input value of generator current and generator temperature is input to the evaluating circuit. At least one output value for controlling at least one of a transmission ratio of the intermediate drive and an exciter current of the generator is output from the evaluating circuit. The power supply system is divided into a plurality of parts. This division enables to conform allowable voltage variations in a single part of the power supply system, to requirements of structural components contained in the single part. The evaluating circuit effects individual voltage regulation for the plurality of parts of the power supply system.

17 Claims, 1 Drawing Sheet

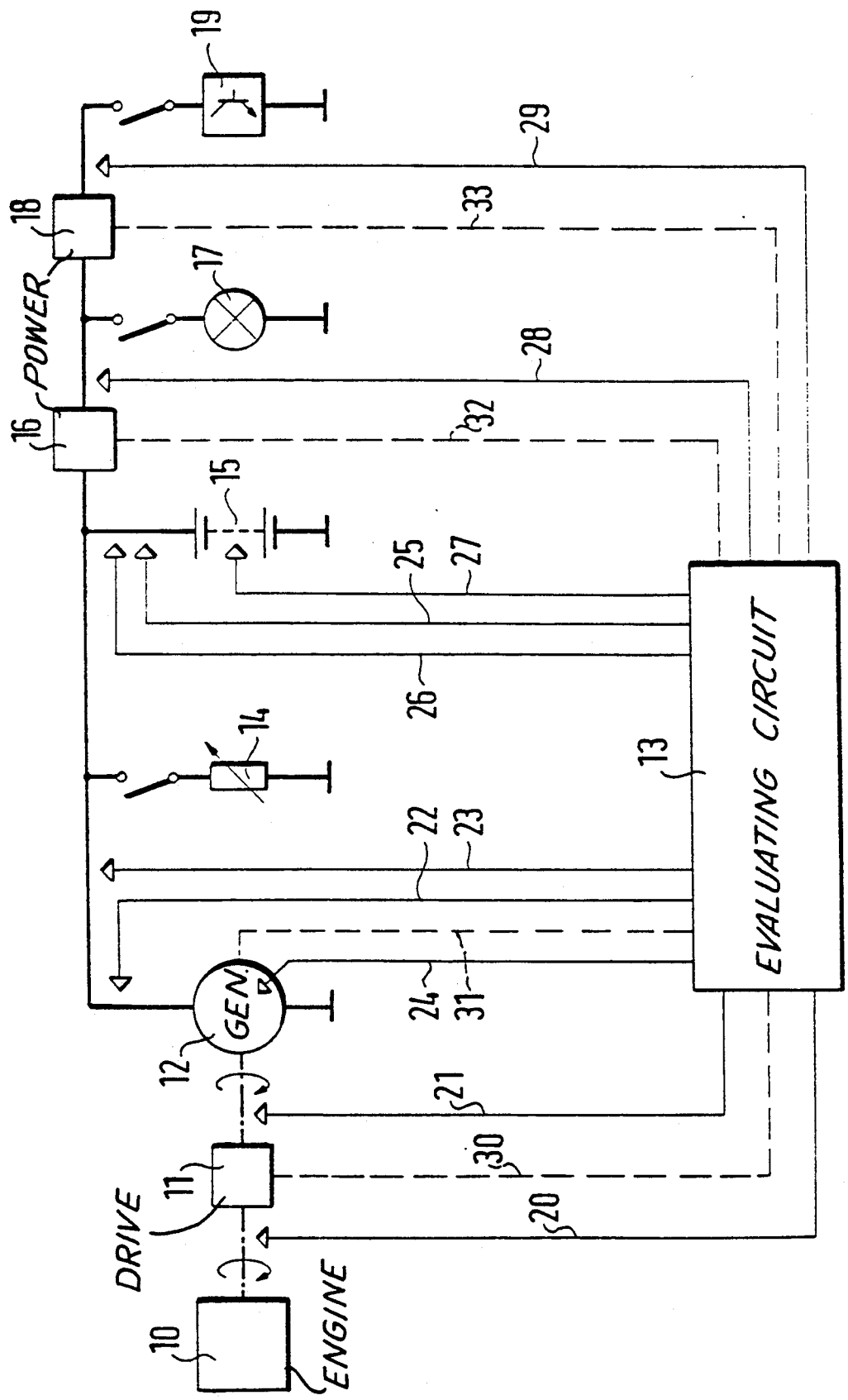

GENERATOR UNIT

The invention relates to a generation unit for a motor vehicle engine including a generator driveable by an internal combustion engine, an on-board power supply system, evaluating circuit to which at least one of engine speed, generator voltage, battery voltage, battery current, battery temperature, and consumer voltage is input.

The voltage supplied by the generator to the on-board power supply system must be regulated and adapted to the respective requirements. Generator units with devices for regulating the generator voltage to be fed into an on-board power supply system are already known. For example, a device for regulating a charging system for a motor vehicle in which the operating parameters as well as the charging system parameters are determined and evaluated at fixed time intervals is described in the DE-OS 33 13 398. The operating parameters of the internal combustion engine are particularly the speed and the air/fuel ratio, the charging system parameters are generator current, generator voltage, battery current and battery voltage.

However, this device for regulating the charging system does not yet comprise all essential parameters; further, the generator speed cannot be influenced independently of the speed of the internal combustion engine as would be desirable for an optimal regulating of the on-board power supply system voltage.

SUMMARY OF THE INVENTION

The object of the invention is a generator unit in which an evaluating circuit determines the parameters of the internal combustion engine and the on-board power supply system which are essential for the voltage regulation, evaluates them while taking into account internally stored characteristic field data, and enables an optimally operable and comprehensive regulation of the generator unit.

An optimal adaptation of the generator to the voltage requirements of the on-board power supply system with respect to speed is effected by an intermediate drive which is connected between the internal combustion engine and the generator which is drivable by the internal combustion engine.

A more simple voltage regulation is made possible by dividing the on-board power supply system into an area with consumers which are not sensitive to voltage, an area with consumers which are sensitive to voltage, and an area with consumer voltage with exact tolerances, preferably for sensitive electronic equipment.

Depending on the priority which is set in each instance, either the noise of the generator unit can be minimized by the aforementioned steps that insure that the generator is continuously operated in a suitable speed range, or is mechanically converted into electrical energy with the lowest possible fuel consumption by reducing the speed of the generator via the intermediate drive during intensive loading of the internal combustion engine and favorable power supply of the battery and consumers without the generator being entirely uncoupled from the internal combustion engine. At full load and simultaneous good voltage supply, the generator can also be completely uncoupled from the internal combustion engine so that the full capacity of the internal combustion engine is available for the drive of the vehicle.

The present invention both as to its construction so to its mode of operation, together with additional objects and advantages thereof, will be best understood from the following detailed description of the preferred embodiment with reference to the accompanying drawings.

BRIEF DESCRIPTION OF THE DRAWINGS

The single FIGURE of the drawings shows a schematic view of the generator unit according to the invention.

DESCRIPTION OF THE PREFERRED EMBODIMENT

The generator unit, according to the invention and shown in the FIGURE comprises a generator 12, which is drivable by an internal combustion engine 10 via an intermediate drive 11 which can be regulated electronically, an evaluating circuit 13, and an on-board power supply system 14, 15, 16, 17, 18, 19. The on-board power supply system is divided in three parts and comprises an area with low demands on the constancy of the voltage, which area, in addition to the battery 15, also contains consumers, e.g., an additional heating, which are not sensitive to voltage and are designated by 14. An area of the on-board power supply system with voltage-sensitive structural components, e.g. lamps, is symbolized by 17, the part of the on-board power supply system containing the very voltage-sensitive electronic structural components is designated by 19.

The individual parts of the on-board power supply system are separated by voltage converters 16 and 18 which enable a more exact voltage regulation of the corresponding on-board power supply system areas with the evaluating circuit.

The following measurement values, internal combustion engine speed, generator speed, generator voltage, generator current, temperature of the structural component parts of the generator (e.g. diodes, bearings, windings), battery voltage, battery current, battery temperature and consumer voltage, are detected with suitable sensors and measuring instruments and transmitted to the evaluating circuit arrangement via the lines 20 to 29 with the following assignment of the lines:

| | |
|---|---|
| internal combustion engine speed | line 20 |
| generator speed | 21 |
| generator voltage | 22 |
| generator current | 23 |
| temperature of structural component parts of generator | 24 |
| battery voltage | 25 |
| battery current | 26 |
| battery temperature | 27 |
| consumer voltage for sensitive consumers | 28 |
| consumer voltage for very sensitive consumers | 29 |

The measurement values are stored in the evaluating circuit and possibly used for regulating the generator unit.

In order to optimize the operation of the generator unit the electronically intermediate drive, the exciter current of the generator, and the two voltage converters in the on-board power supply system can be influenced by the evaluating circuit via the lines 30, 31, 32 and 33.

The individual influencing variables need not all be processed simultaneously. A desired combination can be used depending on the system layout. This also applies to the control variables.

The evaluating circuit contains characteristic fields whose data are coordinated with the generator efficiency, the intermediate drive efficiency, the allowable temperature of the structural component parts, the generator noise, the battery characteristic values and the allowable consumer voltage. The characteristic fields which are determined by testing on a test stand, are optimized in the vehicle according to the given criteria of power demand, consumption, exhaust gas and driving behavior. The output values required for regulating the generator unit are determined in the evaluating circuit from the input sensor information accompanied by the evaluation of the respective stored characteristic fields. In so doing, it can be determined how the priorities are to be set, i.e. the evaluating circuit can influence the transmission ratio of the intermediate drive in such a way that e.g. the overall efficiency is optimized with sufficient voltage supply for battery and consumer. In so doing, mechanical energy is converted into electrical energy with the lowest possible fuel consumption. During an intensive loading of the internal combustion engine, e.g. when driving up mountains or when driving at high speed, the generator output can be reduced by the intermediate drive by reducing the generator speed, and unloading of the internal combustion engine can accordingly be achieved; in extreme cases the generator can be completely uncoupled from the internal combustion engine for the period of the highest loading of the internal combustion engine and accordingly stopped.

The evaluating circuit can be fastened at the housing of the generator or installed at a location of the internal combustion engine remote from the generator.

Due to the limiting of the generator speed to determined areas, it is ensured, on one hand that the noisiness of the generator unit is kept as low as possible, and excessive heat is prevented, on the other hand. Because of the measured parameters, errors can be detected e.g. via plausibility interrogations, and possibly also displayed. It is accordingly ensured that permissible values, e.g., the permissible temperatures of the structural component parts, are not exceeded. While the invention has been illustrated and described as embodied in a generator unit for a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A generator unit for a motor vehicle having an internal combustion engine and consumer means, said generator unit comprising a battery; a generator; an intermediate drive for transmitting a drive torque from the internal combustion engine to said generator; an on-board power supply system; and an evaluating circuit having input means for receiving at least one of an input value of engine speed, generator voltage, generator speed, battery voltage, battery current, battery temperature, and consumer means voltage, and at least one of an input value of generator current and generator part temperature, and output means for outputting at least one output value for controlling at least one of a transmission ratio of said intermediate drive and an exciter current of said generator, said power supply system being divided into a plurality of parts whereby allowable voltage variations in a single part of said power supply system can be conformed to requirements of structural components contained in said single part, said evaluating circuit effecting individual voltage regulation for said plurality of parts of said power supply system.

2. A generator unit according to claim 1, wherein the evaluating circuit output at least one additional output value for controlling one of lamp voltage and electronic means voltage.

3. A generator unit according to claim 1, wherein the evaluating circuit includes a plurality of multi-dimensional characteristic fields containing data corresponding to predetermined generator efficiency, intermediate drive efficiency, allowable temperatures of structural component parts, allowable generator noise, battery characteristic values, and an allowable consumer means voltage.

4. A generator unit according to claim 1, wherein the evaluating circuit controls the transmission ratio of the intermediate drive in such a way that generator speed is kept within a range in which mechanical energy is converted into electrical energy in an optimal manner.

5. A generator unit according to claim 1, wherein the generator output can be reduced above at least one of a determined charging state of the battery and sufficient voltage supply of the consumer means.

6. A generator unit according to claim 5, wherein the unit has means for reducing the generator output by reduction of the generator speed by the intermediate drive.

7. A generator unit according to claim 4, wherein the generator output is reduced as a load of the internal combustion engine increases.

8. A generator unit according to claim 1, wherein the unit has means for uncoupling the generator from the internal combustion engine in full-load operation.

9. A generator unit according to claim 1, wherein priorities can be set in the evaluating circuit for optimization of the most important features.

10. A generator unit according to claim 1, wherein the generator has a housing and means to fasten the evaluating circuit to the housing.

11. A generator unit according to claim 1, wherein the evaluating circuit includes error detection means.

12. A method of optimization of operation of a generator unit for a motor vehicle having an internal combustion engine and consumer means, the generator unit including a battery, a generator, an intermediate drive for transmitting a drive torque from the internal combustion engine to said generator, an on-board power supply system, and an evaluating circuit, said method comprising the steps of:
dividing the power supply system into a plurality of parts whereby allowable voltage variations in a single part of the power supply system can be conformed to requirements of structural components contained in the single part, the evaluating circuit effecting individual voltage regulation for the plurality of parts of the power supply system;
communicating to the evaluating circuit at least one of an input value of engine speed, generator voltage, generator speed, battery voltage, battery current, battery temperature, and consumer means voltage, and at least one of an input value of generator current and generator part temperature for processing therein; and outputting at least one output value for controlling at least one of a transmission ratio of the intermediate drive and an exciter current of the generator.

13. A method according to claim 12, further comprising the step of outputting at least one additional output value for controlling one of lamp voltage and electronic means voltage.

14. A method according to claim 12, comprising the step of controlling the transmission ratio of the intermediate drive in such a way that generator speed is kept within a range in which mechanical energy is converted into electrical energy in an optimal manner.

15. A method according to claim 12, comprising the step of reducing generator output above at least one of a determining charging state of the battery and sufficient voltage supply to consumer means.

16. A method according to claim 12, comprising the step of reducing generator output with an increase of a load of the internal combustion engine.

17. A method according to claim 13, comprising the step of uncoupling the generator from the internal combustion engine at full-load operation.

* * * * *